US008695058B2

(12) United States Patent
Batchu et al.

(10) Patent No.: US 8,695,058 B2
(45) Date of Patent: Apr. 8, 2014

(54) SELECTIVE MANAGEMENT OF MOBILE DEVICE DATA IN AN ENTERPRISE ENVIRONMENT

(75) Inventors: Suresh Kumar Batchu, Milpitas, CA (US); Ajay Kumar Mishra, San Jose, CA (US); Ojas Udayan Rege, Palo Alto, CA (US)

(73) Assignee: Mobile Iron, Inc., Mountain View, CA (US)

( * ) Notice: Subject to any disclaimer, the term of this patent is extended or adjusted under 35 U.S.C. 154(b) by 411 days.

(21) Appl. No.: 12/469,612

(22) Filed: May 20, 2009

(65) Prior Publication Data

US 2010/0299376 A1    Nov. 25, 2010

(51) Int. Cl.
*G06F 17/30* (2006.01)

(52) U.S. Cl.
USPC .......................................................... 726/1

(58) Field of Classification Search
USPC ........................................ 707/999.202; 726/1
See application file for complete search history.

(56) References Cited

U.S. PATENT DOCUMENTS

| | | | |
|---|---|---|---|
| 6,151,606 A | 11/2000 | Mendez | |
| 6,725,444 B2 | 4/2004 | Fergus | |
| 7,702,322 B1 | 4/2010 | Maurya et al. | |
| 7,730,179 B2 | 6/2010 | Tanner | |
| 7,970,386 B2 | 6/2011 | Bhat et al. | |
| 8,005,913 B1* | 8/2011 | Carlander | 709/207 |
| 8,010,997 B2 | 8/2011 | Limont et al. | |
| 8,012,219 B2 | 9/2011 | Mendez et al. | |
| 8,020,192 B2 | 9/2011 | Wright et al. | |
| 2002/0120351 A1* | 8/2002 | Tuomela et al. | 700/16 |
| 2004/0255169 A1* | 12/2004 | Little et al. | 713/202 |
| 2006/0234711 A1* | 10/2006 | McArdle | 455/445 |
| 2006/0236363 A1* | 10/2006 | Heard et al. | 726/1 |
| 2007/0038680 A1 | 2/2007 | Casey | |
| 2007/0064636 A9 | 3/2007 | Koch et al. | |
| 2008/0025243 A1* | 1/2008 | Corneille et al. | 370/313 |
| 2008/0055408 A1 | 3/2008 | Wun | |
| 2008/0127111 A1* | 5/2008 | Perlman et al. | 717/128 |
| 2008/0312941 A1* | 12/2008 | Doyle | 705/1 |
| 2009/0006636 A1* | 1/2009 | Tanner | 709/229 |
| 2009/0036111 A1* | 2/2009 | Danford et al. | 455/419 |
| 2009/0049518 A1* | 2/2009 | Roman et al. | 726/1 |
| 2009/0280795 A1* | 11/2009 | O'Shaughnessy | 455/419 |
| 2010/0277326 A1* | 11/2010 | Berk et al. | 340/636.11 |

OTHER PUBLICATIONS

Manual entitled "MobiControlv6 Help Guide", dated Oct. 24, 2008.*
Article entitled "MobileIron Shows ROI for Enterprise Mobile" by Walling, dated Aug. 5, 2009.*
Article entitled "Intel concept marries smartphones and cloud computing" by Gabriel, dated May 13, 2009.*

(Continued)

*Primary Examiner* — Mahesh Dwivedi
(74) *Attorney, Agent, or Firm* — Van Pelt, Yi & James LLP

(57) ABSTRACT

In various embodiments, a method is described that includes registering a mobile device with an enterprise by storing registration data for the mobile device in a device management database; designating one or more group designations for the mobile device; storing the one or more group designations in the device management database; determining one or more policies for the mobile device based at least in part on the one or more group designations; and selectively taking action on selected data from the mobile device in the device management database based on the one or more policies.

27 Claims, 10 Drawing Sheets

(56) References Cited

OTHER PUBLICATIONS

Article entitled "Mobile Asset Management" by AirWatch, dated Oct. 24, 2008.*

Article entitled "Mobile Device Management—Market Quadrant 2012" by Radicati, dated Dec. 2012.*

Article entitled "Why Traditional Monitoring Tools Cannot Deliver True Mobile User Management for the BlackBerry Platform" by Boxtone, dated Feb. 28, 2008.*

Article entitled "Release Notes" by Soti on Oct. 24, 2008.*

Article entitled Mobile Device Management Buyers Guide, by Solutions Review, dated Apr. 1, 2013.*

Cipherlab Co., Ltd. SOTI MobiControl Software Now Available for CipherLab Windows (R)-based Mobile Computers. Taipei, Taiwan. Mar. 9, 2009.

* cited by examiner

SELECTIVE MANAGEMENT OF MOBILE DEVICE DATA IN AN ENTERPRISE ENVIRONMENT

TECHNICAL FIELD

This disclosure relates generally to mobile devices and management systems.

BACKGROUND

In a manner similar to personal computers and laptops, business enterprises (e.g., companies, corporations, etc.) increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by employees in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting.

BRIEF DESCRIPTION OF THE DRAWINGS

FIGS. 4A-4C illustrate example user interfaces for designating one or more group designations.

FIGS. 7A and 7B illustrate example user interfaces for selectively erasing data from one or more mobile devices.

DESCRIPTION OF EXAMPLE EMBODIMENTS

Figure 1:
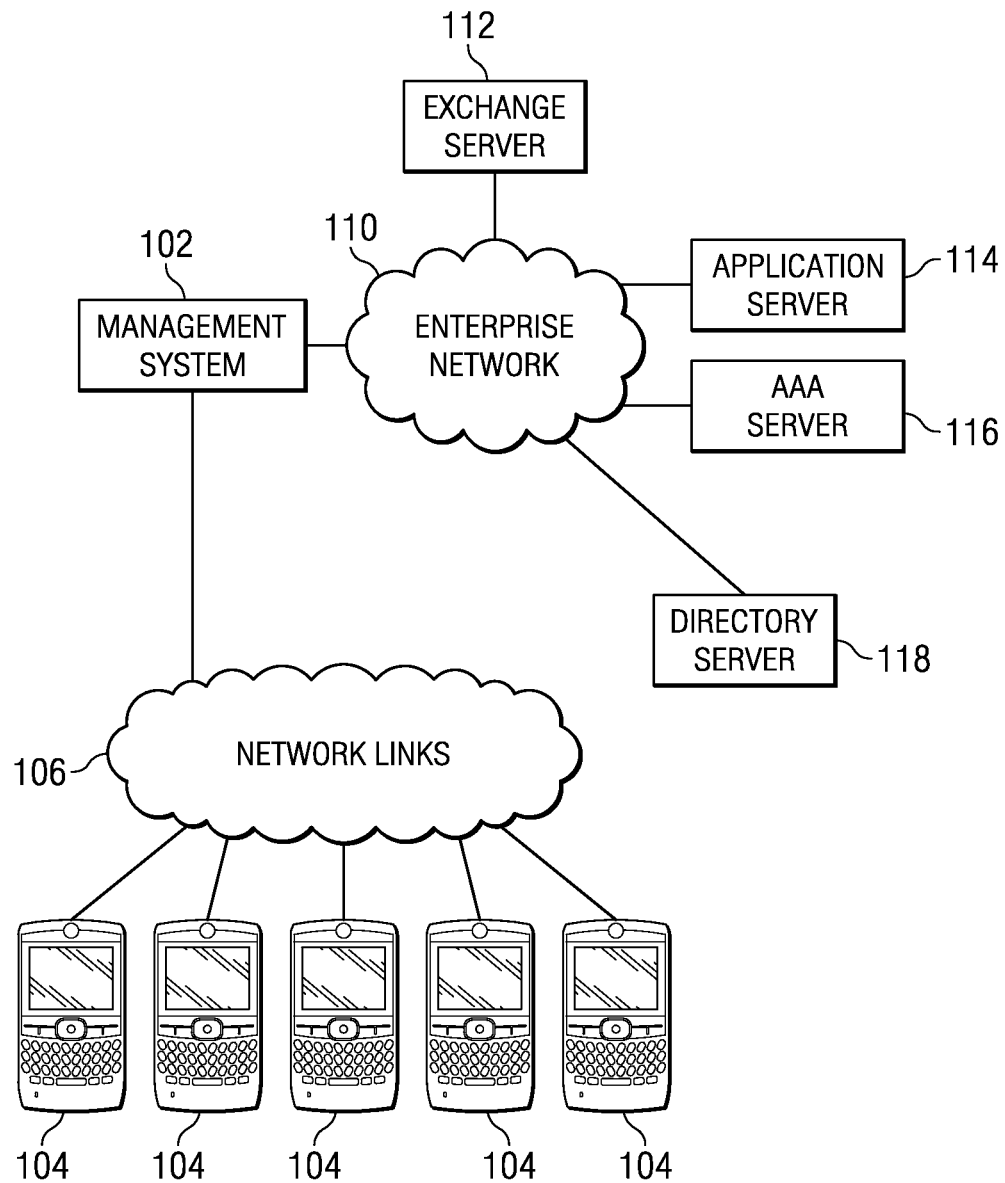
FIG. 1 illustrates an example mobile device management architecture according to an embodiment of the present disclosure.

Particular embodiments of the present disclosure provide methods, apparatuses and systems directed to facilitating and managing the use of mobile devices in an enterprise environment without sacrificing user experience or enterprise security.

In particular embodiments, for each of the mobile devices registered with an enterprise, a mobile device management application hosted on a device management server selectively logs data received from the mobile device. The logged data may include particular files (e.g., documents, spreadsheets, pdfs, pictures, etc.) stored in the mobile device as well particular application usage data in the form of, by way of example, activity data (e.g., data regarding calls, messages, and email), content data (e.g., the text within the message or email body), and/or context data (e.g., timestamps and location data, etc.), as will be described in more detail below. In particular embodiments, the mobile device management application maintains a device object for each mobile device at a device management database connected with or residing at the device management server. In one particular embodiment, the device management application maintains a virtual instance of each mobile device that may completely emulate the corresponding physical instance of the mobile device as described in copending patent application Ser. No. 12/181,124 filed 28 Jul. 2008 and copending patent application Ser. No. 12/421,517 filed 9 Apr. 2009, both of which are hereby incorporated by reference herein. Even in embodiments in which a virtual instance is not maintained, various embodiments may still include systems, devices, components, and functionality similar to those described in these copending applications.

In particular embodiments, each mobile device includes a control client application (hereinafter referred to as "control client") that is configured to interact with the device management application via the device management server and a network link. More particularly, the control client application is configured to receive data, commands, and other messages from the device management server via a network link, to synchronize the state of the mobile device with the corresponding device object stored at the device management database, and to selectively track and upload data over the network link to the device management server and database, as will be described in detail below. In various embodiments, the control client logs man-machine interface (MMI) data, file system commands, and other data characterizing usage of, and/or the actions performed on, the mobile device. Some or all of the log data is provided to the device management application hosted on the device management server, which can synchronize the device object stored at the database with that of the mobile device, and vice versa.

In this manner, the device management application may provide an administrator a detailed snapshot of the state of the mobile device, and facilitate device management operations, as described below. In particular, various embodiments enable selective erasing, tagging, copying, moving, modifying, viewing, and/or other selective action on or of particular data stored in a particular registered mobile device or designated group of mobile devices via the device management server.

FIG. 1 illustrates a block diagram of a computer network environment 100 in accordance with an example embodiment. Computer network environment 100 includes a device management system 102 and a plurality of mobile devices 104 that may each communicate with device management system 102 via one or more network links 106. In various embodiments, device management system 102 may actually comprise one or more device management servers and device management databases, one or more of which may or may not be physically located within the physical boundaries of the enterprise.

Network link(s) 106 may include any suitable number or arrangement of interconnected networks including both wired and wireless networks. By way of example, a wireless communication network link over which mobile devices 104 communicate may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link 106 may further include, or alternately include, a variety of communication channels and networks such as WLAN/WiFi, WiMAX, Wide Area Networks (WANs), and Blue-Tooth.

As FIG. 1 illustrates, device management system 102 may be operably connected with (or included within) an enterprise network 110 (which may include or be a part of network link(s) 106). Enterprise network 110 may further include one or more of email or exchange servers 112, enterprise application servers 114, authentication (AAA) servers 116, directory servers 118, Virtual Private Network (VPN) gateways, firewalls, among other servers and components. The mobile devices 104 may access or utilize one or more of these enterprise systems or associated functionality.

Figure 2:
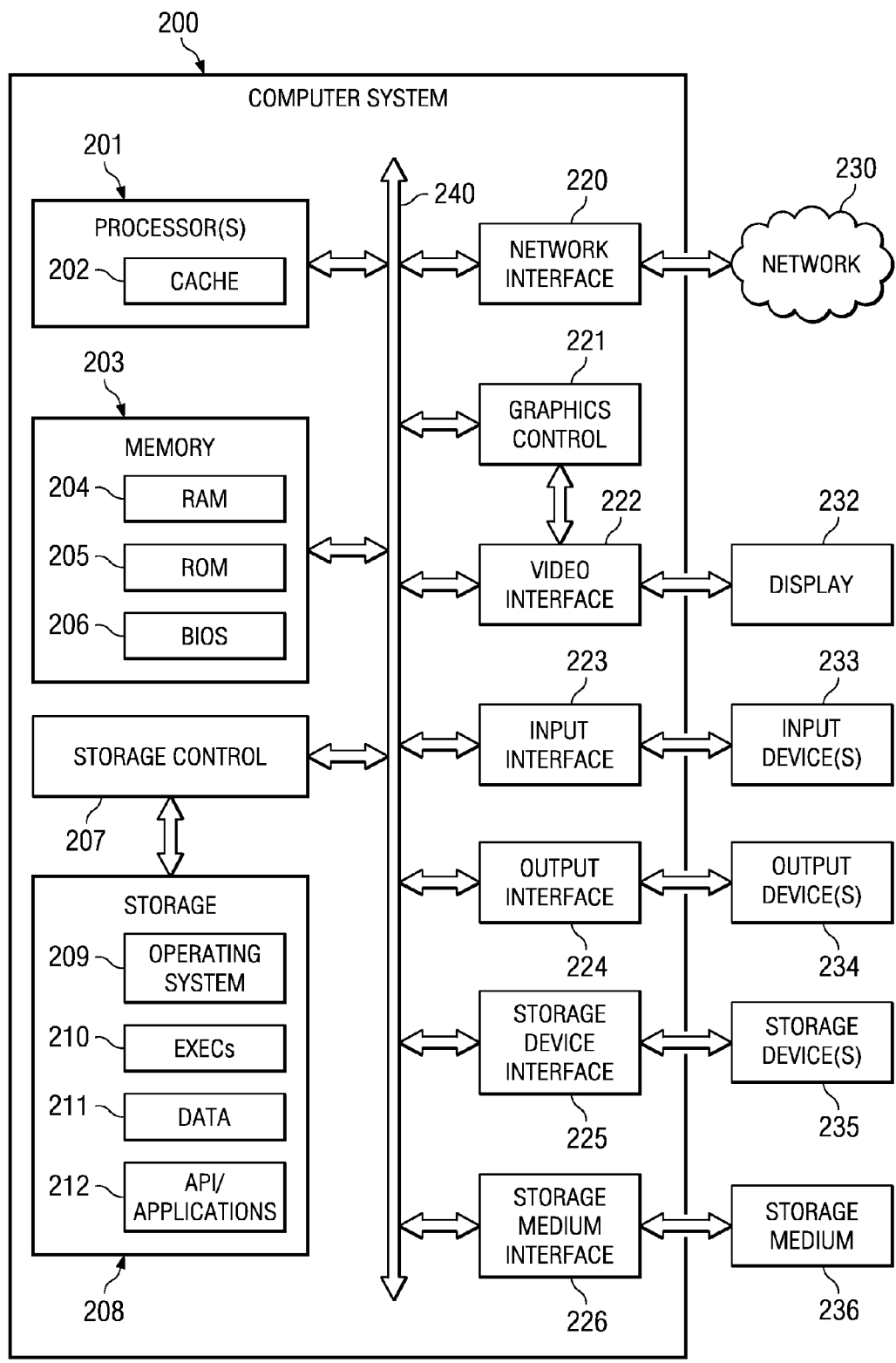
FIG. 2 is a schematic diagram illustrating an example server system architecture.

Management system 102 may actually include one or more hardware, firmware, and software components residing at one or more computer servers or systems (hereinafter referred to as computer systems). Software components of device management system 102 may be at one or more of the same computer systems. FIG. 2 illustrates an example computer system 200. Device management system 102 may include software components at one or more computer systems, which may be similar to example computer system 200. Particular embodiments may implement various functions of device management system 102 as hardware, software, or a combination of hardware and software. As an example and not by way of limitation, one or more computer systems may execute particular logic or software to perform one or more steps of one or more processes described or illustrated with respect to device management system 102. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more tangible computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. A tangible computer-readable medium may include one or more nanometer-scale components or otherwise embody nanometer-scale design or fabrication. Example tangible computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

The components in FIG. 2 are examples only and do not limit the scope of use or functionality of any hardware, software, embedded logic component, or a combination of two or more such components implementing particular embodiments. Computer system 200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 200 may include a display 232, one or more input devices 233 (which may, for example, include a keypad, a keyboard, a mouse, a stylus, etc.), one or more output devices 234, one or more storage devices 235, and various tangible storage media 236.

Bus 240 connects a wide variety of subsystems. Herein, reference to a bus may encompass one or more digital signal lines serving a common function, where appropriate. Bus 240 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 201 (or central processing unit(s) (CPU(s))) optionally contains a cache memory unit 202 for temporary local storage of instructions, data, or computer addresses. Processor(s) 201 are coupled to tangible storage devices including memory 203. Memory 203 may include random access memory (RAM) 204 and read-only memory (ROM) 205. ROM 205 may act to communicate data and instructions unidirectionally to processor(s) 201, and RAM 704 may act to communicate data and instructions bidirectionally with processor(s) 201. ROM 205 and RAM 204 may include any suitable tangible computer-readable media described below. Fixed storage 208 is connected bidirectionally to processor(s) 201, optionally through storage control unit 207. Fixed storage 208 provides additional data storage capacity and may also include any suitable tangible computer-readable media described. Storage 208 may be used to store operating system 209, EXECs 210, data 211, application programs 212, and the like. Typically, storage 208 is a secondary storage medium (such as a hard disk) that is slower than primary storage. Information in storage 208 may, in appropriate cases, be incorporated as virtual memory in memory 203.

Processor(s) 201 is connected to multiple interfaces, such as graphics control 221, video interface 222, input interface 223, output interface 224, storage interface 225, and storage medium interface 226. These interfaces are in turn connected to appropriate devices, as may be illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer system, or other suitable I/O device or a combination of two or more such I/O devices. Processor(s) 201 may connect to another computer system or to telecommunications network 230 (which may include network link 106 or enterprise network 110) through network interface 220. With network interface 220, CPU 201 may communicate with network 230 in the course of performing one or more steps of one or more processes described or illustrated herein, according to particular needs. Moreover, one or more steps of one or more processes described or illustrated herein may execute solely at CPU 201. In addition or as an alternative, one or more steps of one or more processes described or illustrated herein may execute at multiple CPUs 201 that are remote from each other across network 230.

In particular embodiments, when computer system 200 is connected to network 230, computer system 200 may communicate with other devices, specifically mobile devices 104 and enterprise systems, connected to network 230. Communications to and from computer system 200 may be sent through network interface 220. For example, network interface 220 may receive incoming communications (such as requests or responses from other devices) in the form of one or more packets (such as Internet Protocol (IP) packets) from network 230 and computer system 200 may store the incoming communications in memory 203 for processing. Computer system 200 may similarly store outgoing communications (such as requests or responses to other devices) in the form of one or more packets in memory 203 and communicated to network 230 from network interface 220. Processor(s) 201 may access these communication packets stored in memory 203 for processing.

Computer system 200 may provide functionality as a result of processor(s) 201 executing software embodied in one or more tangible computer-readable storage media, such as memory 203, storage 208, storage devices 235, and/or storage medium 236. The computer-readable media may store software that implements particular embodiments, and processor(s) 201 may execute the software. Memory 203 may read the software from one or more other computer-readable media (such as mass storage device(s) 235, 236) or from one or more other sources through a suitable interface, such as network interface 220. The software may cause processor(s) 201 to carry out one or more processes or one or more steps of one or more processes described or illustrated herein. Carrying out such processes or steps may include defining data structures stored in memory 203 and modifying the data structures as directed by the software. In addition or as an alternative, computer system 200 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

In particular embodiments, a mobile device 104 is a wireless phone such as a mobile or cellular phone. By way of example, mobile device 104 may be a smartphone (e.g., the iPhone or iPhone 3G manufactured by Apple Inc. of Cupertino, Calif., the BlackBerry manufactured by Research in Motion (RIM), the G1 based on the Android operating system, or Samsung BlackJack based on the Windows Mobile operating system), feature phone, basic cellular phone, personal digital assistant, or other multimedia device. Additionally, mobile device 104 may be affiliated with and supported by any suitable carrier or network service provider such as, by way of example, Sprint PCS, T-Mobile, Verizon, AT&T, or other suitable carrier.

In particular embodiments, various different employees of the same enterprise may have different billing plans. By way of example, in general, most employees will have corporate liable mobile device (e.g., phone) plans. These plans are billed to the enterprise by the service provider. However, some employees may wish to use their own personal phones for enterprise related calls, text, data transmission and other enterprise usage. Such plans are known as individual liable plans. Such plans are billed to the individual employee by the corresponding employee's service provider (which may be different from the service provider supporting the enterprise's corporate liable mobile devices). Generally, the employee pays the bill and then submits an expense report (e.g., monthly) to the enterprise seeking reimbursement for the employee's enterprise related mobile activities.

Figure 3:
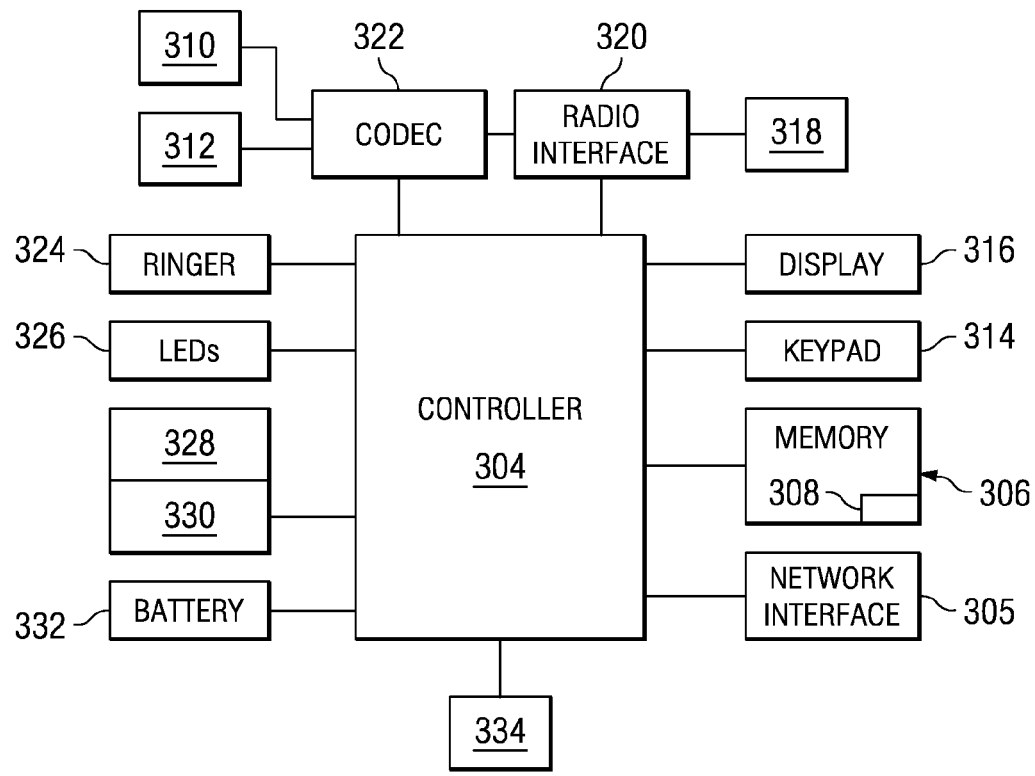
FIG. 3 is a schematic diagram illustrating an example mobile device system architecture.

FIG. 3 shows a schematic representation of the main components of an example mobile device 104, according to various particular embodiments, which is adapted for use in connection with a GSM network or any other mobile telephone network as described above, and which may also be configured to meet the wireless application protocol specification (WAP). Mobile device 104 generally includes a controller 304 which may comprise a microcontroller or one or more processors configured to execute instructions and to carry out operations associated with mobile device 104. In various embodiments, controller 304 may be implemented as a single-chip, multiple chips and/or other electrical components including one or more integrated circuits and printed circuit boards. Controller 304 may optionally contain a cache memory unit for temporary local storage of instructions, data, or computer addresses. By way of example, using instructions retrieved from memory, controller 304 may control the reception and manipulation of input and output data between components of mobile device 104.

Controller 304 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 308 described below) and/or data may be physically stored within a memory block 306 that is operatively coupled to controller 304.

Memory block 306 encompasses one or more storage mediums and generally provides a place to store computer code (e.g., software and/or firmware) and data that are used by mobile device 104. By way of example, memory block 306 may include various tangible computer-readable storage media including Read-Only Memory (ROM) and/or Random-Access Memory (RAM). As is well known in the art, ROM acts to transfer data and instructions unidirectionally to controller 304, and RAM is used typically to transfer data and instructions in a bi-directional manner. Memory block 306 may also include one or more fixed storage devices in the form of, by way of example, solid-state hard disk drives (HDDs), among other suitable forms of memory coupled bi-directionally to controller 304. Information may also reside on a removable storage medium loaded into or installed in mobile device 104 when needed. By way of example, any of a number of suitable memory cards may be loaded into mobile device 104 on a temporary or permanent basis. By way of example, mobile device 104 may also include a subscriber identification module (SIM) card 328 and a SIM card reader 330.

Controller 304 is also generally coupled to a variety of interfaces such as graphics control, video interface, input interface, output interface, and storage interface, and these interfaces in turn are coupled to the appropriate devices. Controller 304 is also coupled to a network interface 305 that allows mobile device 104, and particularly controller 304, to be coupled to another computer (e.g., device management system 102) or telecommunications network (e.g., network link 106 or enterprise network 110). More particularly, network interface 305 generally allows controller 304 to receive information from network link 106, or might output information to the network link in the course of performing various method steps described below. Communications may be sent to and from mobile device 104 via network interface 305. By way of example, incoming communications, such as a request or a response from another device (e.g., device management system 102), in the form of one or more packets, may be received from network link 106 at network interface 305 and stored in selected sections in memory block 306 for processing. Outgoing communications, such as a request or a response to another device (e.g., device management system 102), again in the form of one or more packets, may also be stored in selected sections in memory 306 and sent out to network link 106 at network interface 305. Controller 304 may access these communication packets stored in memory 306 for processing.

Electric signals (e.g., analog) may be produced by microphone 310 and fed to earpiece 312. Controller 304 may receive instruction signals from keypad 314 (which may include soft keys) and control the operation of display 316 (In alternate embodiments, keypad 314 may be implemented as a virtual keypad displayed on display 316). By way of example, display 316 may incorporate liquid crystal display (LCD), light emitting diode (LED), Interferometric modulator display (IMOD), or any other suitable display technology. Radio signals may be transmitted and received by means of an antenna 318 that may be connected through a radio interface 320 to codec 322 configured to process signals under control of controller 304. Thus, in use for speech, codec 322 may receive signals (e.g., analog) from microphone 310, digitize them into a form suitable for transmission, and feed them to radio interface 320 for transmission through antenna 318 to, for example, a public land mobile network (PLMN). Similarly, received signals may be fed to codec 322 so as to produce signals (e.g., analog) which may be fed to ear piece 312. Mobile device 104 also generally includes a ringer (e.g., speaker) 324 and may also include light emitting diodes (LEDs) 326. In particular embodiments, mobile device 104 may be a dual mode phone having a wireless local area network (WLAN) interface, Worldwide Interoperability for Microwave Access (WiMAX) interface, and/or other wireless or physical interfaces (such as BlueTooth® and USB). Additionally, mobile device 104 may be powered by a removable battery pack 332.

Mobile device 104 may also include one or more user input devices 334 (other than keypad 314) that are operatively coupled to the controller 304. Generally, input devices 334 are configured to transfer data, commands and responses from the outside world into mobile device 108. By way of example, mobile device may include a joystick or directional pad. Input devices 334 may also include one or more hard buttons.

Display device 316 is generally configured to display a graphical user interface (GUI) that provides an easy to use visual interface between a user of the mobile device 104 and the operating system or application(s) running on the mobile device. Generally, the GUI presents programs, files and operational options with graphical images. During operation, the user may select and activate various graphical images displayed on the display 316 in order to initiate functions and tasks associated therewith.

In particular embodiments, each mobile device 104 includes a control client 308 that is configured to interact with the device management system 102 via network link 106. Control client 308 may generally be implemented as one or more software programs or applications stored in, by way of example, memory 306. Control client 308 is configured to receive data, commands, and other messages from the device management system 102 via network link 106, to synchronize the state of the mobile device 104 with a corresponding device object stored at a device management database, and to selectively track and upload data over the network link to the device management system for logging by the device management system, as will be described in detail below. The logged data may include particular files (e.g., documents, spreadsheets, pdfs, pictures, etc.) stored in the mobile device as well particular application usage data in the form of, by way of example, activity data (e.g., data regarding calls, messages, and email), content data (e.g., the text within the message or email body), and/or context data (e.g., timestamps and location data, etc.), as will be described in more detail below. In various embodiments, the control client logs man-machine interface (MMI) data, file system commands, and other data characterizing usage of, and/or the actions performed on, the mobile device. Some or all of the log data is provided to the device management application hosted on the device management server, which can synchronize the device object stored at the database with that of the mobile device, and vice versa.

In this manner, the device management system 102 may provide an administrator a detailed snapshot of the state of each mobile device 104, and facilitate device management operations, as described below. In particular, various embodiments enable selective erasing, tagging, copying, moving, modifying, viewing, and/or other selective action on or of particular data stored in a particular registered mobile device or designated group of mobile devices via the device management server.

In particular embodiments, device management system 102 is configured to selectively log data from each of the mobile devices 104 of an enterprise. More particularly, mobile device 104 may be configured to selectively track and/or log data and to upload this data to device management system 102 which, in turn, selectively logs or stores the data. In particular embodiments, each mobile device 104 is first registered with the device management system 102 by creating and storing a device object for the mobile device within the device management system 102. By way of example, an employee desiring to use a personally owned mobile device 104 may indicate to management that he or she desires to use the personally owned mobile device 104 with enterprise related services (e.g., email or access to an enterprise database) and needs enterprise access. Alternately, an employee receiving a mobile device 104 under a corporate liable plan may receive an enterprise owned mobile device 104 upon commencing employment or receiving a mobile device upgrade, by way of example. In particular embodiments, registering a mobile device 104 with the device management system 102 includes creating and storing a device object in a database within or connected with device management system 102. The device object may be implemented as part of a data structure corresponding to the particular mobile device 104. By way of example, a particular device object may include a device identifier that uniquely identifies the corresponding mobile device.

Figure 4A:
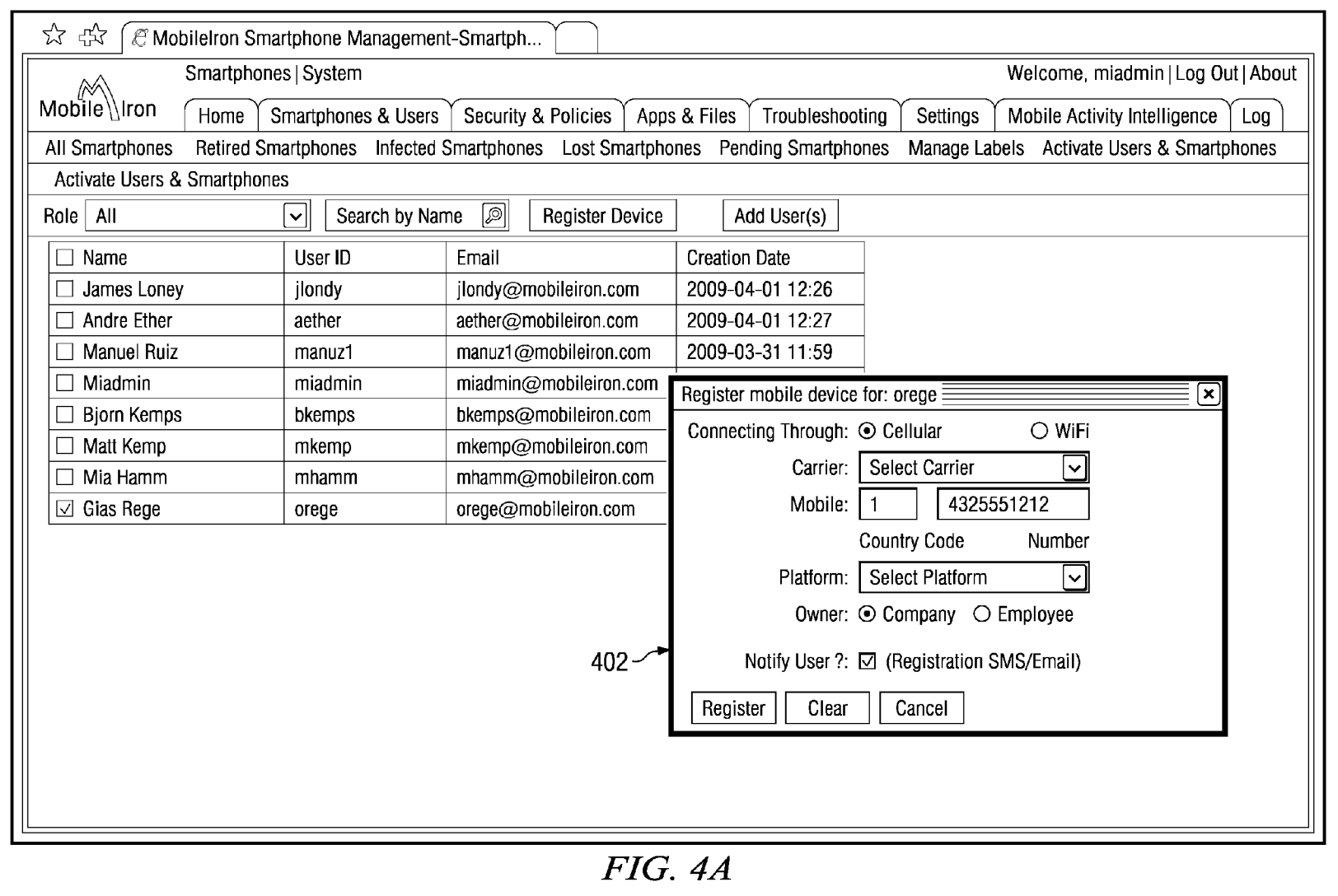
Figure 4B:
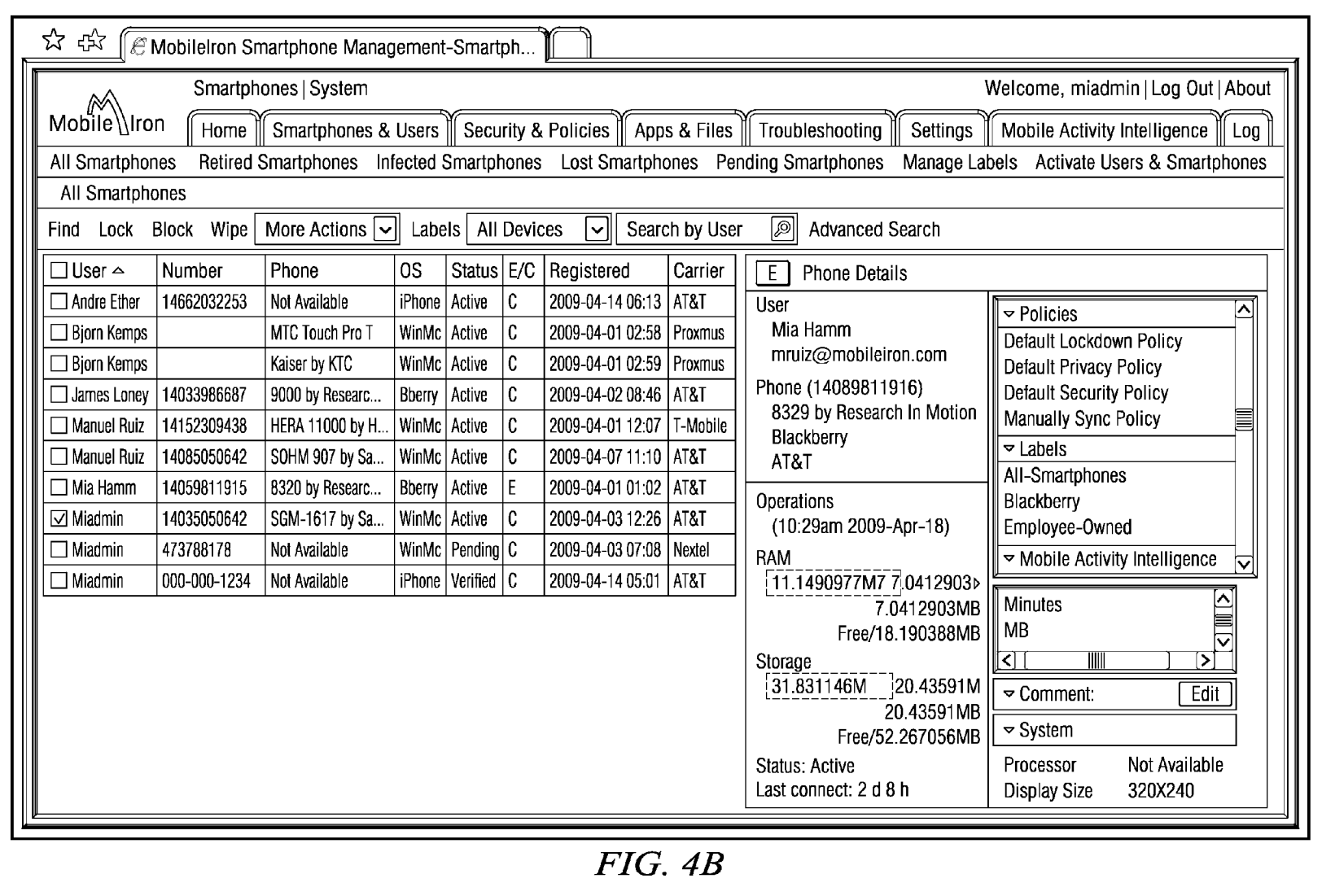
Figure 4C:

In particular embodiments, device management system 102 designates one or more group designations for the particular mobile device 104. By way of example, device management system may present a user interface to an IT manager or administrator enabling the manager to enter designation information for each of a plurality of mobile devices. Device management system 102 then designates the one or more group designations with the mobile device by storing or otherwise associating the group designations with the device object within the database. FIGS. 4A-4C illustrate example user interfaces for designating one or more group designations (also referred to herein as labels) for one or more mobile devices 104 of an enterprise. By way of example, an IT manager may utilize active window 402 to designate the particular mobile device 104 as being either personally owned or enterprise (company) owned as illustrated in FIG. 4A (e.g., C=company owned, E=employee owned). As another example, the IT manager may designate the mobile device 104 as being registered with an employee of a particular enterprise department (e.g., sales, marketing, research and development, management, human resources, accounting, etc.). As another example, the IT manager may designate the mobile device 104 as being registered with an employee of a particular class (e.g., management, staff, intern, new hire, etc.). As yet another example, a mobile device 104 may be designated based on the type (e.g., smartphone versus non-smartphone) or manufacturer (e.g., blackberry, apple) of the mobile device 104, as shown in FIGS. 4B and 4C. In some embodiments, some or all of the group designations may be designated and stored automatically by device management system 102 based on mined information already stored in the database or other location.

Figure 5A:
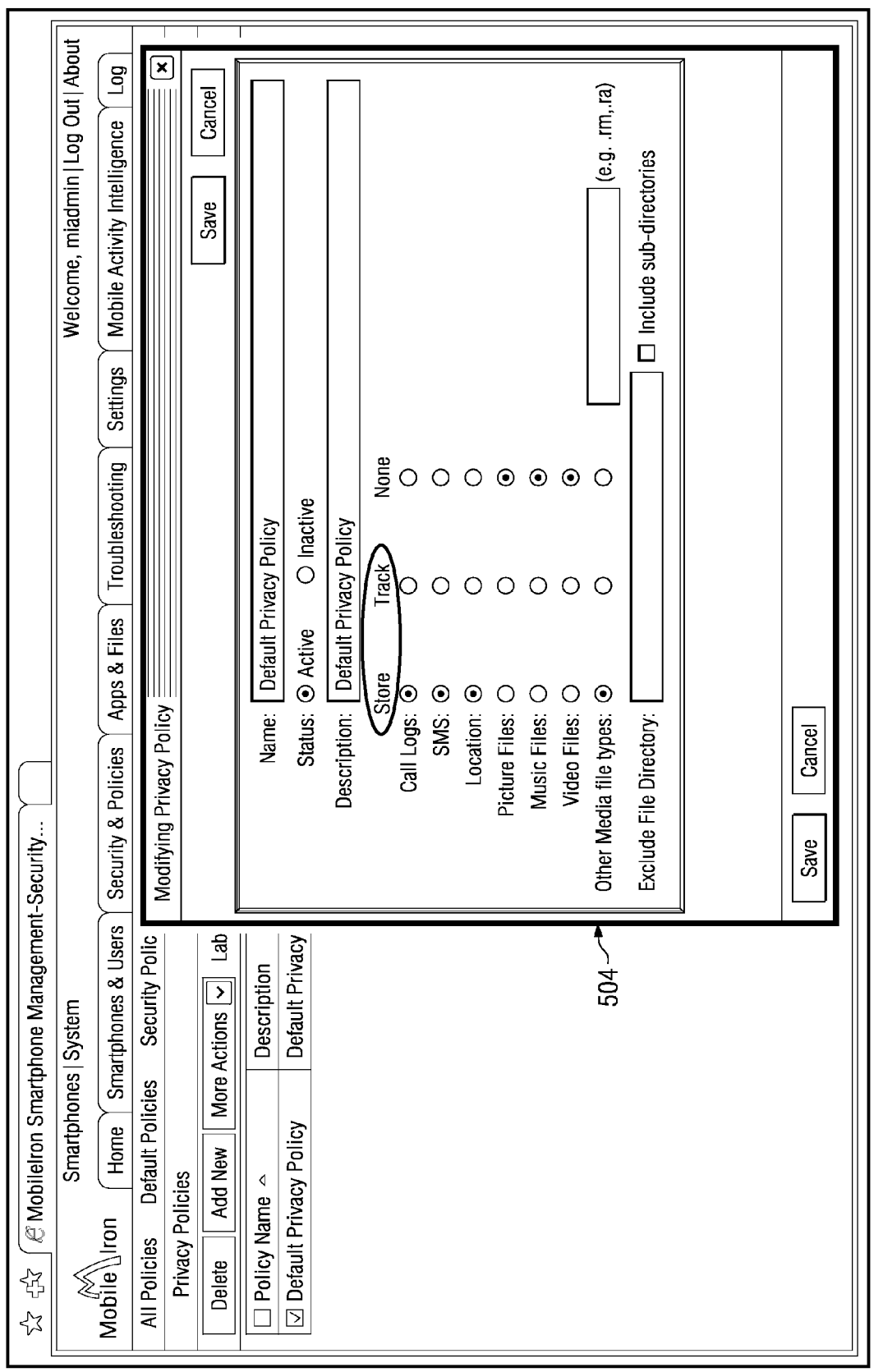
FIGS. 5A and 5B illustrate example user interfaces for selecting data logging policies for one or more mobile devices.
Figure 5B:
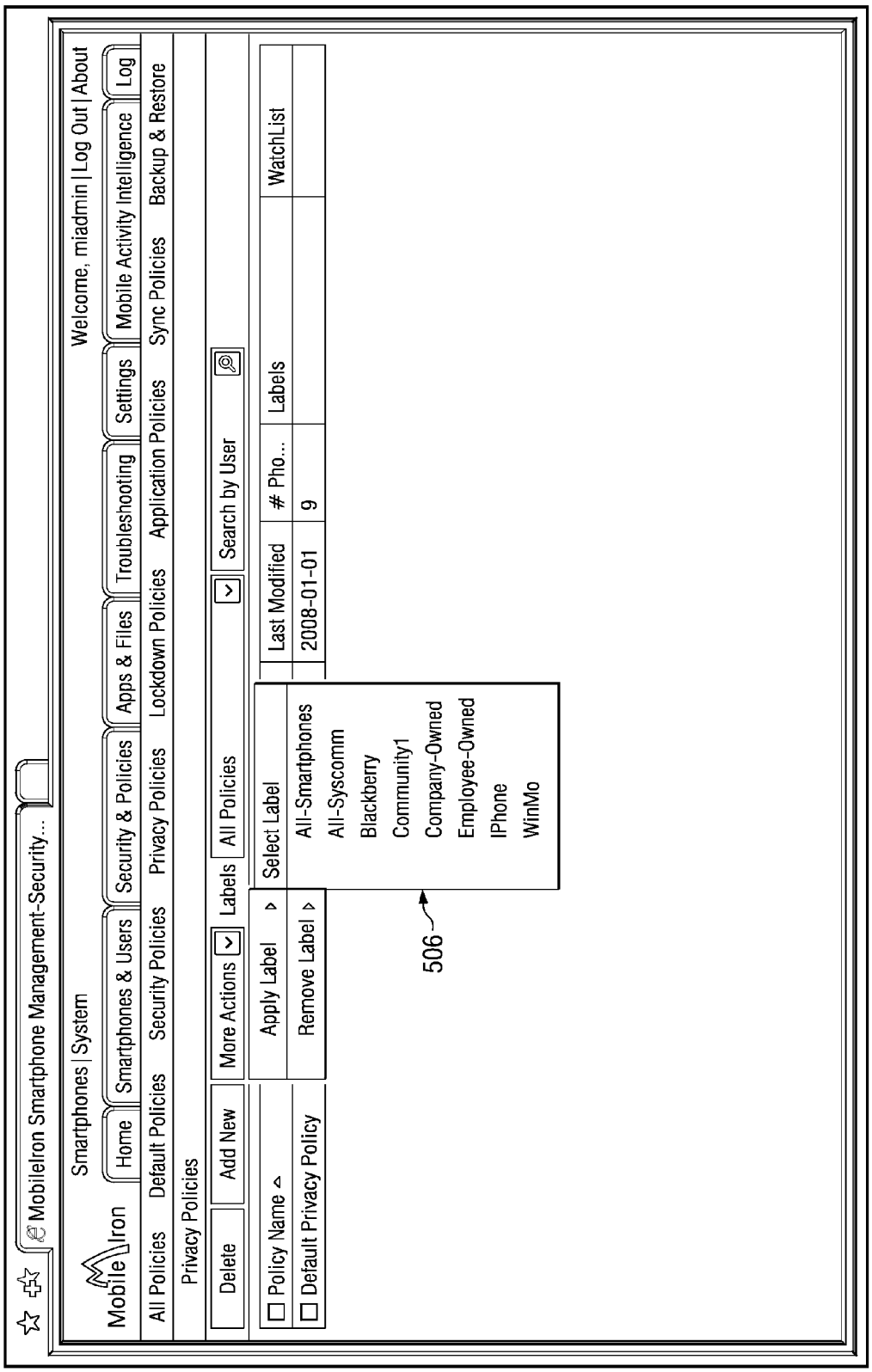

Device management system 102 determines one or more data logging policies for each mobile device based on the group designations associated with each particular mobile device. By way of example, an enterprise manager or administrator may dictate particular policies and enter these policies via active window 404 into device management system 102 as shown in FIGS. 5A and 5B (e.g., see active windows 504 and 506, respectively). Afterwards, when group designations are matched to a particular mobile device 104, device management system may then, using the policies entered by the manager, automatically determine data logging policies for the mobile device 104. The data logging policies govern which data is logged (e.g., tracked and/or uploaded) from a particular mobile device to device management system 102. By way of example, a particular device object may be associated with one or more data logging policies stored within the database. Device management system 102 selectively logs (e.g., tracks and/or stores) data from the mobile devices 104 of the enterprise based on the data logging policies associated with each particular mobile device.

In particular embodiments, the database within or connected with device management system 102 stores resources associated with the mobile devices 104. By way of example, each resource may store a particular file, or generally a data structure, as well as corresponding metadata. Each mobile device 104 also stores (e.g., within memory 306) a number of resources each storing a file or data structure and corresponding metadata. In particular embodiments, when control client 308 determines that a particular file or other data structure (hereinafter referred to as "file") has been newly stored, updated, or otherwise modified within mobile device 104, control client 308 creates a hash for the particular file and causes mobile device 104 to transmit the hash to device management system 102. Upon receipt of the hash, device management system 102 determines if the particular file corresponding to the hash (and the file in the mobile device 104) is already stored in one of the resources stored within device management system 102. In particular embodiments, if device management system 102 determines that the resource already exists, the device management system 102 creates a new resource link to the resource and stores or otherwise associates the new resource link with the device object corresponding to the mobile device 104.

In particular embodiments, if device management system 102 determines that an earlier version of the file exists within an existing resource within device management system 102, then device management system 102 sends a message to control client 308 requesting the resource (or alternately data that corresponds to the differences between the modified file and the original or earlier version of the file). Upon receipt of the new version, device management system 102 may store the new version as a new resource (and may associate the new resource with the pre-existing resource containing the earlier version) and may create a new resource link for the modified resource and associate the new resource link with the corresponding device object. If the device management system 102 determines that no version of the resource exists within the device management system 102, then the device management system 102 sends a message to control client 308 requesting the resource from mobile device 102. Upon receipt of the new resource, device management system 102 stores the resource as a new resource within device management system 102 and creates a new resource link for the new resource that it then associates with the corresponding device object.

In particular embodiments, only particular resources from the mobile device 104 are logged by device management system 102 and associated with the corresponding device object within device management system 102. By way of example, in particular embodiments, the data logging policies for a particular mobile device 104 (or particular group of mobile devices sharing one or more group designations) may cause device management system 102 to selectively log data corresponding to a particular file type (e.g., .doc, .xls, .jpeg, .mpeg, .pdf, .mp3, etc.). That is, device management system 102 may request client 308 to selectively track and upload these resources, and device management system 102 may selectively track and store the uploaded resources. Similarly, in particular embodiments, the data logging policies for a particular mobile device 104 may cause device management system 102 to selectively log data within one or more particular folders or directories.

As another example, in particular embodiments, the data logging policies for a particular mobile device 104 may cause device management system 102 to selectively log data corresponding to predetermined period of time (e.g., within the last week, within the last month, since the mobile device was registered, or within any selected time frame). As another example, in particular embodiments, the data logging policies for a particular mobile device 104 may cause device management system 102 to selectively log data corresponding to files stored in the mobile device (or modified in the mobile device) by the employee (e.g., pictures stored by the employee, documents stored by the employee, music stored by the employee, etc.). As yet another example, in particular embodiments, the data logging policies for a particular mobile device 104 may cause device management system 102 to selectively log data corresponding to files pre-tagged by an administrator. By way of example, client 308 may be configured to track resources pre-tagged or otherwise recognizable as confidential, enterprise-privileged, black-listed, restricted, regulatory, and those that contain customer data, etc.

In particular embodiments, the data logging policies for a particular mobile device 104 may cause device management system 102 to selectively log data corresponding to particular application usage data within device management system 102. By way of example, device management system 102 may include an application usage log for the mobile devices 104 registered with the enterprise. By way of example, in particular embodiments, the data logging policies for a particular mobile device 104 may cause device management system 102 to selectively log data corresponding to particular activity data. By way of example, the particular activity data may comprise voice (or call) usage information, SMS usage information (or other text message protocol information), or other data usage information (e.g., MMS or internet/web browser data usage). In particular, activity data may include the number of calls made by a particular user, the durations of such calls, and the identity of the user placing a particular call.

As another example, in particular embodiments, the data logging policies for a particular mobile device 104 may cause device management system 102 to selectively log data corresponding to particular context data corresponding to particular activity data. By way of example, context data may include information concerning the receiver of a particular call, whether the call was domestic versus international, the location of the user or receiver of the call at the time of the call (which may be determined using GPS, Cell ID, or other location detection technology and which may be incorporated into the corresponding mobile phone), the type of network used to make the call (e.g., 3G or 2G, as well as carrier), among other information.

Similar to voice usage, SMS, email, and other data usage may also be tracked and logged. By way of example, device management system 102 may log activity data such as the number of SMS messages sent and/or received, the quantity (e.g., in kilobytes (kB) or megabytes (MB)) of data sent or received in each SMS message, as well as the quantity of data sent or received in an MMS message, email message, or from the internet in, for example, a mobile web browsing session. Device management system 102 may also log context data such as, by way of example, network information (e.g., 3G or 2G, as well as carrier), average or current network speed (e.g., kB/s or MB/s), and from whom, to whom, and when the data was sent, as well as where the transmitting and receiving parties are physically or geographically located. Regarding internet usage, device management system 102 may also log which websites a user navigates to as well as the duration and frequency of usage. Additionally, device management system 102 may also be configured to log which applications a user of a mobile device 104 uses, how frequently the user uses each application, which applications the user has downloaded, uploaded or otherwise installed, among other application data.

In particular embodiments, the data logging policies, as described above, may be implemented on an individual, group, department, or enterprise basis, among other divisions. Additionally, data logging policies may vary based on the type of usage (e.g., voice call, SMS, MMS, email, internet, etc.) By way of example, while device management system 102 may log the number of SMS messages or email messages sent or received for a particular mobile device 104 based on the data logging policies associated with the mobile device, device management system 102 may or may not store the content of these messages (hereinafter referred to as content data). That is, in an example embodiment, device management system 102 may be configured to track and store activity data activity and/or context data associated with emails or SMS text messages, but not the content (i.e., message body) of the email or SMS text message. Alternately, the data logging policies may cause particular email or text messages, including the content data, to be archived in the device management database. In particular embodiments, it is the responsibility of the enterprise manager to legislate the data logging policies even though it is device management system 102 that may implement the data logging policies. By way of example, as described above, an enterprise manager may choose different data logging policies for each mobile device 104 depending on the group designations associated with the particular mobile device.

Figure 6:
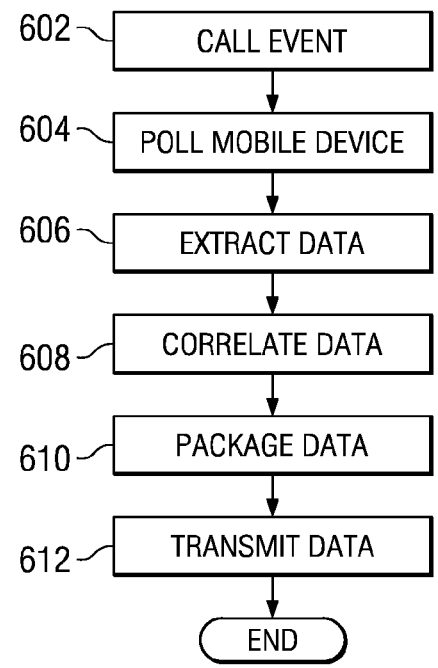
FIG. 6 shows a flowchart illustrating an example process for collecting and receiving call data from a mobile device.

FIG. 6 shows a flowchart illustrating an example process for collecting and receiving call data from a mobile phone. In a particular embodiment, the data is collected by the client (e.g., client 308) in the background of the normal operations of the mobile device 104. In some embodiments, any and all of the data described above may be collected and transmitted by the mobile devices on an event driven, periodic or continuous (e.g., whenever available) basis. As described above, data logging for various mobile devices 104 may vary according to the user of the particular mobile device or the device itself. By way of example, mobile phones that are roaming may be tracked more frequently then those that are not. The usage data may be temporarily stored in memory 306 within the mobile device and, specifically, within various data storage logs such as, for example, a file system log, behavior log, control log, or in other call and data usage logs.

In one particular embodiment, upon occurrence of a call event at 602 (e.g., a call end event corresponding to the termination of a call), device management system 102 polls the mobile device 104 at 604. The mobile device client 308 then extracts usage data associated with the call at 606. By way of example, the call data may include any of the call information described above. This usage data may be collected from, by way of example, any of the aforementioned data storage logs. The mobile device client 308 may then timestamp or otherwise correlate the usage data with context data at 608 based on the time of usage (e.g., start time of the call and end time of the call) and other identifying and descriptive data. In particular embodiments, the usage data is also correlated based on the geographical location (i.e., "location"-stamp the usage data) of the mobile device at the time of the call (e.g., obtained through GPS location data). In particular embodiments, the usage data is also correlated based on the cellular tower used by the mobile device during the call. More particularly, information that is usable in identifying a cellular tower used by the mobile device during use is associated with the usage data (the device management server or other server or computer system may then use this cellular tower information to identify the specific cellular tower used by the mobile device during the call). In various embodiments, the usage data may also be correlated with other user data, carrier data, enterprise data, etc.

The client 308 or other module may then package (or cause to be packaged) the relevant correlated data at 610 and transmit the packaged data at 612 to device management system 102. Additionally or alternatively, various data may be collected, correlated, packaged, and transmitted on a periodic or threshold basis (e.g., once data levels reach a predetermined memory level).

In a similar fashion, SMS text, email or other data usage information may also be collected by the mobile device client 308 and stored in various memory locations and/or SMS and data logs. By way of example, SMS text or MMS message information may be collected, correlated, packaged and transmitted to device management system 102 upon receipt or sending of an SMS or MMS message. As another example, data associated with emails may be transmitted upon receipt or sending of an email message, upon downloading an email message from an email server (e.g., from a BlackBerry® server), upon opening of an email, as well as on periodic or threshold bases.

In general, it may be desirable to transmit any of the described data as frequently as possible while keeping power consumption associated with the collecting, correlating, packaging, and (especially) transmitting below a power consumption threshold.

In various embodiments, the employee using the mobile device 104, in addition to an enterprise administrator, may also be presented with a user interface showing the data (or at least a portion) logged by the device management system 102. Moreover, some or all of the employees may have access to a user interface, based on the group designations designated to their respective mobile devices, that allows these employees to tag files, calls, and/or other data within their respective mobile devices as personal. In some embodiments, data tagged by an employee as personal may not be logged by device management server. In other embodiments, some data tagged as personal may be logged, but access to the logged personal data may be restricted to only one or a few high-level administrators. Additionally or alternately, in some embodiments, device management server 102 and/or mobile devices 104 may include algorithms that, based on data usage for example, intelligently determine personal versus enterprise (work) data for purposes of billing, audit, privacy, etc.

In some embodiments, an administrator may not be able to view some or all of the data logged by device management system 102. By way of example, the administrator may be able to view activity and/or context data, but not content data or particular files determined to be personal files. Additionally, in some embodiments rule-based access may be provided to ensure data privacy. By way of example, one class of administrators will not have access to any activity, content, or context data, another class of administrators may have access only to activity data, while a "super" administrator may have access to all activity, content, and context data. Furthermore, such access may be sliced based on group designation such that, by way of example, an administrator may only have access to particular data for a single division, department, or other group of the enterprise.

In particular embodiments, device management system 102 is additionally or alternatively configured to selectively erase (or selectively "wipe") particular data in a particular mobile device 104 (or group of devices sharing one or more group designations) of an enterprise based on one or more erasure policies associated with the one or more mobile devices. As those of skill in the art will appreciate, conventionally an enterprise only has the ability to erase all the data, i.e., bring the mobile device 104 back to the factory reset state. Again, each mobile device 104 may be registered with device management system 102 as described above. Additionally, device management system 102 designates one or more group designations for each mobile device 104 as described above. Furthermore, device management system 102 determines one or more data erasure policies for each mobile device 104 based on the group designations associated with each particular mobile device. By way of example, an enterprise manager or administrator may dictate particular erasure policies and enter these policies via a user interface. Upon the determination that particular data in one or more particular mobiles devices 104 is to be erased, device management system 102 causes the particular data to be erased in the mobile devices.

Figure 7A:
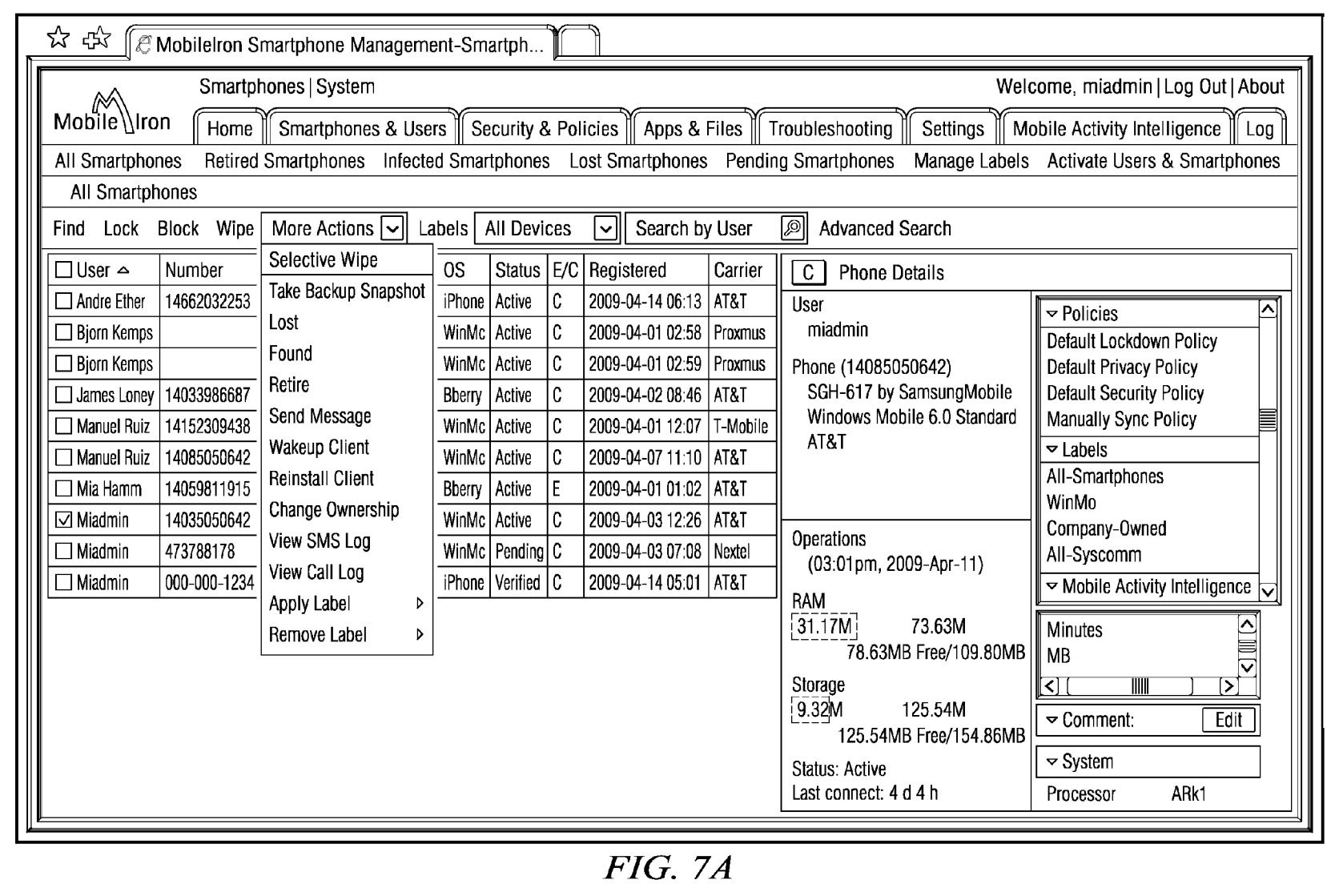

By way of example, when an enterprise manager determines that some or all of the data in a particular mobile device 104 should be erased, the enterprise manager may select the particular device or devices using a user interface, as shown in FIG. 7A. By way of example, the enterprise manager may determine that the data should be erased because the mobile device has been unsecured, lost, or stolen, the employee associated with the mobile device has voluntarily terminated employment with the enterprise, the employee has been involuntarily terminated by the enterprise (e.g., "fired"), the mobile device has or is to be retired or deactivated, the mobile device is to be transitioned to another employee, or the mobile device has been infected by a virus or malicious program. In particular embodiments, the erasure policies govern the selective erasure (e.g., determine which data is to be erased) based in part on the determination of why the particular data is to be erased (e.g., device unsecured). In alternate embodiments, device management system 102 may be configured to make the determination that particular data should be erased automatically and subsequently automatically select the data to be erased.

In particular embodiments, selectively erasing particular data for a particular mobile device 104 includes erasing resource links stored within or associated with the device object corresponding to the particular mobile device. More particularly, the resource links are erased that correspond to the particular resources within the device management system 102 that correspond to the resources in the mobile device containing the data to be erased. Device management system 102 then synchronizes the modified device object with the mobile device 104. More particular, device management system 102 may pass a device object mapping to client 308. Upon receipt of the device object mapping, client 308 erases or causes to be erased the resources within the mobile device 104 that no longer have corresponding resource links in the corresponding device object.

By way of example, in particular embodiments, the data erasure policies for a particular mobile device 104 may cause device management system 102 to selectively erase or selectively not erase data corresponding to a particular file type (e.g., .doc, .xls, .jpeg, .mpeg, .pdf, .mp3, etc.), folder, and/or directory. By way of example, Microsoft Excel documents may be determined to more likely contain enterprise privileged information (e.g., confidential or customer data), and as such, one of the erasure policies may dictate that Microsoft Excel documents should be erased at a particular mobile device 104. As another example, in particular embodiments, the data erasure policies for a particular mobile device 104 may cause device management system 102 to selectively erase or selectively not erase data stored, updated or otherwise modified within a predetermined period of time (e.g., within the last week, within the last month, since the mobile device was registered, or within any selected time frame). As another example, in particular embodiments, the data erasure policies for a particular mobile device 104 may cause device management system 102 to selectively erase or selectively not erase data corresponding to files stored in the mobile device by the employee (e.g., pictures stored by the employee, documents stored by the employee, music stored by the employee, etc.).

Figure 7B:
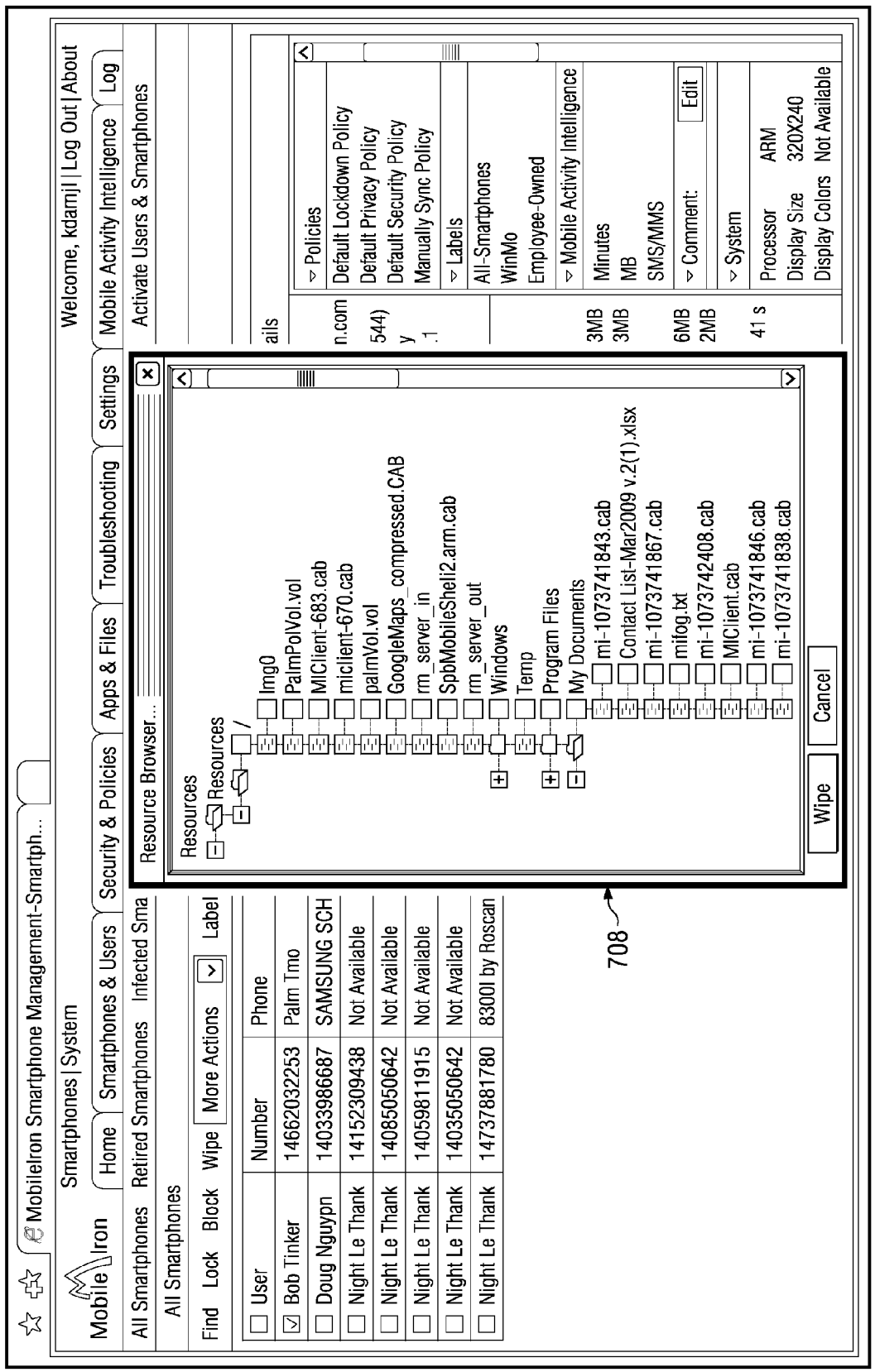

As another example, in particular embodiments, the data erasure policies for a particular mobile device 104 may cause device management system 102 to selectively erase or selectively not erase data corresponding to files that have been pre-tagged. By way of example, client 308 may be configured to erase resources pre-tagged or otherwise recognizable as confidential, enterprise-privileged, black-listed, restricted, regulatory, and those that contain customer data, etc. By way of example, in particular embodiments, the data erasure policies for a particular mobile device 104 may cause device management system 102 to selectively erase data that has been designated as black-listed automatically and immediately after being detected by client 308 and/or device management system 102. As another example, in particular embodiments, the data erasure policies for a particular mobile device 104 may cause device management system 102 to selectively erase or selectively not erase data corresponding to files stored in a particular folder or directory. By way of example, an enterprise administrator may be presented with a user interface that includes a file browser 708 showing a file tree including directories or folders as shown in FIG. 7B. The enterprise administrator may then select particular files, folders, or directories to be erased in the mobile device.

In this manner, an employee that used his or her own personal mobile device may leave the enterprise knowing that the user's personal data is safe. That is, if or when the employee leaves the enterprise, the device management system 102 may selectively erase enterprise-privileged data (e.g., emails, documents, etc.) and leave the user's personal data (e.g., personal emails, pictures, music) stored in the mobile device. A user may be more likely to buy into or subscribe to an enterprise's security policies if the user is assured that the user's personal data is safe; that is, that the user's personal data will not be erased without the user's consent.

It should also be appreciated that an administrator may select a group of mobile devices 104 to be partially erased simultaneously. It should additionally be appreciated that device management system 102 may be configured to delete all the data on a particular mobile device (i.e., return the mobile device to factory reset). Additionally, in particular embodiments, client 308 may be selectively erased or automatically erased in a partial erasure or complete erasure, respectively.

Although selective logging and erasure have been primarily described as actions that can be taken on a desired granular basis (e.g., individual, group, or sub-group level), it should also be noted that other actions may be taken at a variable granular level. By way of example, an enterprise administrator may set policies for tagging, viewing, moving, copying, and otherwise modifying particular data stored in a particular mobile device 104 or group of mobile devices 104 sharing one or more group designations. As a specific example, an administrator may select all the mobile devices 104 associated with the staff group designation within the research and development department, and tag all Microsoft Excel files in these mobile devices 104.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
    registering a mobile device with an enterprise by storing registration data for the mobile device in a device management database;
    designating, using one or more device management servers, one or more group designations for the mobile device at least in part by designating the mobile device as being employee owned;
    storing the one or more group designations in the device management database, including by storing, in a device object comprising a data structure corresponding to the mobile device, data that associates the one or more group designations with the mobile device as represented in the device management database;
    determining, by the one or more device management servers, one or more data logging policies for the mobile device based at least in part on the data that associates the one or more group designations with the mobile device as represented in the device management database, and on previously stored data that associates the one or more data logging policies with the one or more group designations;
    selectively logging, by the one or more device management servers, selected data from the mobile device in the device management database based on the one or more data logging policies;
    designating, based at least in part on input from an employee owner of the mobile device the selected data as personal content data; and
    selectively providing access to the personal content data based at least in part on a role associated with an administrative user such that a first group of administrative users is provided less restricted access to the personal content data than a second group of administrative users, wherein the employee owner and the administrative user are associated with the enterprise.

2. The method of claim 1, wherein registering the mobile device with the enterprise by storing registration data for the mobile device in the device management database comprises creating and storing a device object for the mobile device in the device management database, the device object comprising a device object identifier that uniquely identifies the mobile device, and wherein storing the one or more group designations in the device management database comprises associating the one or more group designations with the device object.

3. The method of claim 2, wherein the device management database comprises a plurality of first resources, each first resource comprising a file or other data structure and metadata associated with the file or other data structure, and wherein the mobile device comprises a plurality of second resources stored in the mobile device, each second resource comprising a file or other data structure and metadata associated with the file or other data structure, and wherein selectively logging selected data comprises:
    logging particular second resources stored in the mobile device based on the data logging policies.

4. The method of claim 3, wherein selectively logging comprises:
    creating and storing a new first resource in the device management database, the new first resource corresponding to a particular second resource stored in the mobile device; and
    generating and storing a resource link in the device management database, the resource link associating the device object with the new first resource.

5. The method of claim 3, wherein selectively logging comprises:
    generating and storing one or more resource links in the device management database, each resource link associating the device object with one or more first resources stored in the device management database, the one or more first resources corresponding to one or more second resources stored in the mobile device.

6. The method of claim 3, wherein logging particular second resources comprises one or more of:

logging second resources corresponding to a particular file type, file folder, or file directory based on the data logging policies;
logging second resources stored or modified at the mobile device within a particular period of time based on the data logging policies; and
logging second resources that have been tagged.

7. The method of claim 1, wherein selectively logging selected data comprises:
storing application usage data in the device management database.

8. The method of claim 7, wherein the application usage data comprises activity data, the activity data comprising call usage data, email usage data, text messaging usage data, or internet usage data, and wherein only selected activity data is logged based on the one or more data logging policies.

9. The method of claim 8, wherein the application usage data comprises context data that correlates the activity data based on location data corresponding to the activity data or time data corresponding to the activity data, and wherein only selected context data is logged with corresponding activity data based on the one or more data logging policies.

10. The method of claim 8, wherein the application usage data comprises content usage data, and wherein only selected content data is logged based on the one or more data logging policies.

11. The method of claim 1, wherein designating the one or more group designations for the mobile device comprises designating the mobile device as corresponding to an employee owner of a particular enterprise department or a particular enterprise employee class.

12. The method of claim 1, wherein the one or more data logging policies comprise a data retention policy.

13. The method of claim 1, wherein the data comprises communication records.

14. The method of claim 1, wherein the data comprises application data.

15. The method of claim 1, wherein the data comprises context data.

16. The method of claim 1, wherein the first group of administrative users includes one or more higher-level administrators, and the second group of administrative users includes one or more lower-level administrators.

17. The method of claim 1, wherein selectively providing access comprises selectively providing access to the personal content data based at least in part on the role associated with the administrative user and the group designations for the mobile device.

18. One or more computer-readable non-transitory tangible storage media encoding software that is operable when executed to:
register a mobile device with an enterprise by storing registration data for the mobile device in a device management database;
designate one or more group designations for the mobile device at least in part by designating the mobile device as being employee owned;
store the one or more group designations in the device management database, including by storing, in a device object comprising a data structure corresponding to the mobile device, data that associates the one or more group designations with the mobile device as represented in the device management database;
determine one or more data logging policies for the mobile device based at least in part on the data that associates the one or more group designations with the mobile device as represented in the device management database, and on previously stored data that associates the one or more data logging policies with the one or more group designations; and
selectively log selected data from the mobile device in the device management database based on the one or more data logging policies;
designate, based at least in part on input from an employee owner of the mobile device the selected data as personal content data; and
selectively provide access to the personal content data based at least in part on a role associated with an administrative user such that a first group of administrative users is provided less restricted access to the personal content data than a second group of administrative users, wherein the employee owner and the administrative user are associated with the enterprise.

19. The media of claim 18, wherein the software operable when executed to register the mobile device with the enterprise by storing registration data for the mobile device in the device management database comprises software operable when executed to create and store a device object for the mobile device in the device management database, the device object comprising a device object identifier that uniquely identifies the mobile device, and wherein the software operable when executed to store the one or more group designations in the device management database comprises software operable when executed to associate the one or more group designations with the device object.

20. The media of claim 19, wherein the device management database comprises a plurality of first resources, each first resource comprising a file or other data structure and metadata associated with the file or other data structure, and wherein the mobile device comprises a plurality of second resources stored in the mobile device, each second resource comprising a file or other data structure and metadata associated with the file or other data structure, and wherein the software operable when executed to selectively log selected data comprises software operable when executed to:
log particular second resources stored in the mobile device based on the data logging policies.

21. The media of claim 20, wherein the software operable when executed to log particular second resources comprises software operable when executed to log one or more of:
second resources corresponding to a particular file type, file folder, or file directory based on the data logging policies;
second resources stored or modified at the mobile device within a particular period of time based on the data logging policies; and
second resources that have been tagged.

22. The media of claim 18, wherein the software operable when executed to selectively log selected data comprises software operable when executed to:
store application usage data in the device management database.

23. An apparatus comprising:
one or more processors; and
a memory coupled to the processors and tangibly storing one or more instructions, the processors operable when executing the instructions to:
register a mobile device with an enterprise by storing registration data for the mobile device in a device management database;
designate one or more group designations for the mobile device at least in part by designating the mobile device as being employee owned;

store the one or more group designations in the device management database, including by storing, in a device object comprising a data structure corresponding to the mobile device, data that associates the one or more group designations with the mobile device as represented in the device management database;

determine one or more data logging policies for the mobile device based at least in part on the data that associates the one or more group designations with the mobile device as represented in the device management database, and on previously stored data that associates the one or more data logging policies with the one or more group designations;

selectively log selected data from the mobile device in the device management database based on the one or more data logging policies;

designate, based at least in part on input from an employee owner of the mobile device the selected data as personal content data; and selectively provide access to the personal content data based at least in part on a role associated with an administrative user such that a first group of administrative users is provided less restricted access to the personal content data than a second group of administrative users, wherein the employee owner and the administrative user are associated with the enterprise.

24. The apparatus of claim 23, wherein the processors operable when executing the instructions to register the mobile device with the enterprise by storing registration data for the mobile device in the device management database comprise processors operable when executing the instructions to create and store a device object for the mobile device in the device management database, the device object comprising a device object identifier that uniquely identifies the mobile device, and wherein the processors operable when executing the instructions to store the one or more group designations in the device management database comprise processors operable when executing the instructions to associate the one or more group designations with the device object.

25. The apparatus of claim 24, wherein the device management database comprises a plurality of first resources, each first resource comprising a file or other data structure and metadata associated with the file or other data structure, and wherein the mobile device comprises a plurality of second resources stored in the mobile device, each second resource comprising a file or other data structure and metadata associated with the file or other data structure, and wherein the processors operable when executing the instructions to selectively log selected data comprise processors operable when executing the instructions to:

log particular second resources stored in the mobile device based on the data logging policies.

26. The apparatus of claim 25, wherein the processors operable when executing the instructions to log particular second resources comprise processors operable when executing the instructions to log one or more of:

second resources corresponding to a particular file type, file folder, or file directory based on the data logging policies;

second resources stored or modified at the mobile device within a particular period of time based on the data logging policies; and second resources that have been tagged.

27. The apparatus of claim 24, wherein the processors operable when executing the instructions to selectively log selected data comprise processors operable when executing the instructions to:

store application usage data in the device management database.

* * * * *